US009574484B1

(12) United States Patent
Tylutki et al.

(10) Patent No.: US 9,574,484 B1
(45) Date of Patent: Feb. 21, 2017

(54) ENGINE CONTROL FOR DIESEL PARTICULATE FILTER EFFICIENCY ASSESSMENT

(71) Applicant: GM GLOBAL TECHNOLOGY OPERATIONS LLC, Detroit, MI (US)

(72) Inventors: Vincent J. Tylutki, Livonia, MI (US); Igor Anilovich, Walled Lake, MI (US); Christopher Whitt, Howell, MI (US); Cristian Taibi, Torino (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/950,061

(22) Filed: Nov. 24, 2015

(51) Int. Cl.
| | |
|---|---|
| *F01N 3/00* | (2006.01) |
| *F01N 11/00* | (2006.01) |
| *F01N 3/021* | (2006.01) |
| *F02D 41/00* | (2006.01) |
| *F01N 3/025* | (2006.01) |
| *F01N 3/10* | (2006.01) |
| *F01N 3/20* | (2006.01) |

(52) U.S. Cl.
CPC .............. *F01N 11/00* (2013.01); *F01N 3/021* (2013.01); *F01N 3/0253* (2013.01); *F01N 3/106* (2013.01); *F01N 3/2066* (2013.01); *F02D 41/005* (2013.01); *F01N 2560/05* (2013.01); *F01N 2900/0412* (2013.01)

(58) Field of Classification Search
USPC ................. 60/274, 276, 278, 286, 295, 297, 311, 60/602, 605
See application file for complete search history.

(56) References Cited

U.S. PATENT DOCUMENTS

| | | | | |
|---|---|---|---|---|
| 7,765,792 | B2* | 8/2010 | Rhodes .................... | F01N 3/027 60/276 |
| 8,384,397 | B2* | 2/2013 | Bromberg ............... | F01N 3/025 123/679 |
| 8,561,388 | B2* | 10/2013 | Yahata .................. | F01N 11/007 60/274 |
| 9,212,613 | B2* | 12/2015 | Argolini ............. | F02D 41/0245 |
| 2014/0013741 | A1* | 1/2014 | Ukropec ............... | F01N 3/0293 60/605.2 |

* cited by examiner

*Primary Examiner* — Binh Q Tran

(74) *Attorney, Agent, or Firm* — Quinn Law Group, PLLC

(57) ABSTRACT

A method is disclosed for controlling a diesel engine equipped with a diesel particulate filter (DPF). The method includes detecting steady state operation of the engine generating a first flow rate of particulate matter (PM) directed into the DPF. The method also includes, during the steady state operation, triggering exhaust gas recirculation to the engine and thereby directing a second PM flow rate that is greater than the first flow rate into the DPF. The method additionally includes detecting a PM flow rate exiting the DPF in response to the second PM flow rate directed into the DPF. The method also includes comparing the detected PM flow rate exiting the DPF with a PM flow rate threshold. Furthermore, the method includes regulating injection of fuel to regenerate the DPF, if the detected PM flow rate exiting the DPF is greater than the PM flow rate threshold.

20 Claims, 2 Drawing Sheets

ENGINE CONTROL FOR DIESEL PARTICULATE FILTER EFFICIENCY ASSESSMENT

TECHNICAL FIELD

The present disclosure is drawn to a system and a method devised to control a diesel internal combustion engine for assessing efficiency of a diesel particulate filter (DPF).

BACKGROUND

Various exhaust after-treatment devices have been developed to effectively limit exhaust emissions from internal combustion engines. An after-treatment system for a modern diesel engine exhaust typically incorporates a diesel particulate filter (DPF) for collecting and disposing of the sooty particulate matter emitted by the diesel engine prior to the exhaust gas being discharged to the atmosphere.

Generally, a DPF acts as a trap for removing the particulate matter from the exhaust stream. A typical DPF contains precious metals, such as platinum and/or palladium, which serve as catalysts to further oxidize soot and hydrocarbons present in the exhaust stream. The DPF may be regenerated or cleaned using superheated exhaust gas to burn off the collected particulate.

SUMMARY

A method is disclosed for controlling a diesel engine in fluid communication, via an exhaust system, with an exhaust after-treatment (AT) system having a diesel particulate filter (DPF). The method includes detecting steady state operation of the diesel engine at which the engine generates a first flow rate of particulate matter (PM) or soot, directed via the exhaust system into the DPF. The method also includes triggering, during the steady state operation of the engine, a valve to regulate exhaust gas recirculation (EGR) to the engine and thereby direct a second flow rate of particulate matter via the exhaust system into the DPF. The second flow rate is greater than the first flow rate. The method additionally includes detecting, via a PM sensor positioned downstream of the DPF, a flow rate of particulate matter exiting the DPF in response to the second flow rate of particulate matter directed into the DPF. The method also includes communicating, via the PM sensor, to a controller a signal indicative of the detected flow rate of particulate matter exiting the DPF. Additionally, the method includes comparing, via the controller, the detected flow rate of particulate matter exiting the DPF with a particulate matter flow rate threshold. Furthermore, the method includes regulating, via the controller, injection of fuel into the exhaust system to regenerate the DPF, i.e., burn off particulate matter collected thereon, if the detected flow rate of particulate matter exiting the DPF is greater than the particulate matter flow rate threshold.

The steady state operation of the diesel engine may be identified as engine operation when each of the engine speed and load is substantially constant.

The method may also include setting a signal indicative of the DPF having failed, such as via a malfunction indicator lamp (MIL), if the detected flow rate of particulate matter exiting the DPF is greater than the particulate matter flow rate threshold following the regulated injection of fuel into the exhaust system to burn off particulate matter collected in the DPF.

The controller may be programmed with a look-up table correlating the second flow rate of particulate matter directed via the exhaust system into the DPF during the steady state operation of the engine with the detected flow rate of particulate matter exiting the DPF to establish a threshold for an acceptable DPF.

The first flow rate of particulate matter may be outside detection accuracy or sensitivity of the PM sensor. On the other hand, the second flow rate of particulate matter may be within detection accuracy of the PM sensor.

The detection accuracy of the PM sensor may be reduced by collection of particulate matter thereon.

The first flow rate of particulate matter may be around 1.1 milligrams per cubic meter of exhaust gas flow, while the second flow rate of particulate matter may be greater than the first flow rate by at least 10% or greater than 1.2 milligrams per cubic meter of exhaust gas flow.

A system for controlling regeneration in a diesel engine AT system and a vehicle employing such a system are also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
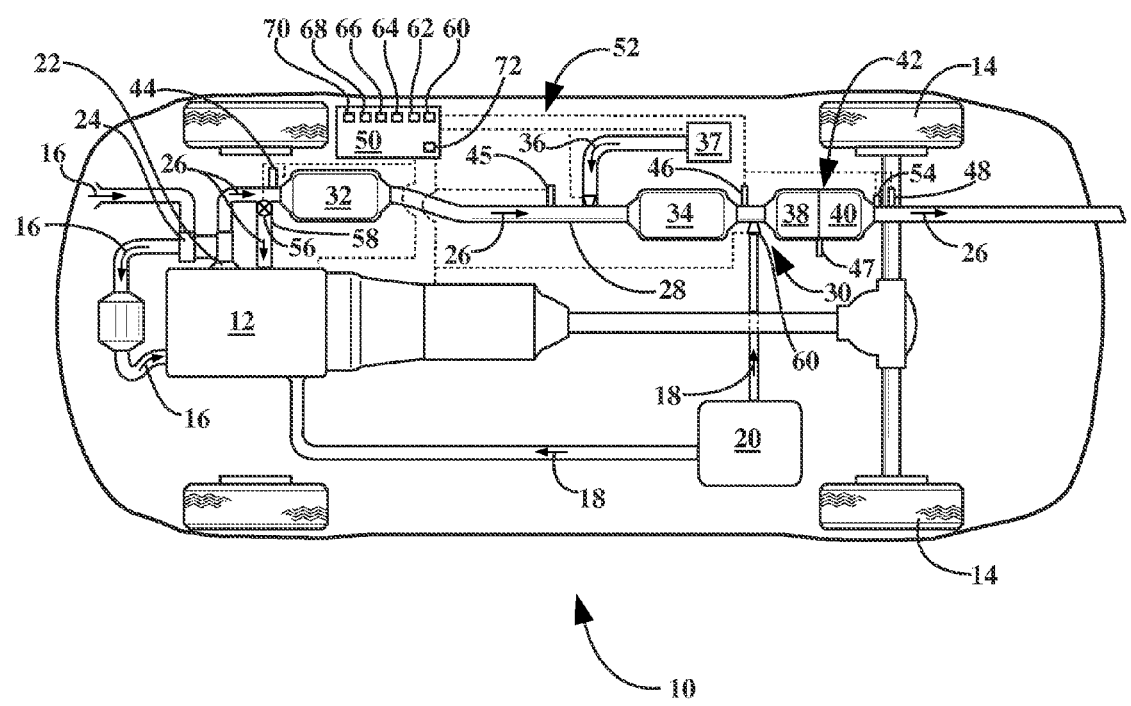
FIG. 1 is a schematic plan view of a vehicle having a diesel engine connected to an exhaust system having an after-treatment (AT) system for reducing exhaust emissions.

Referring to the drawings, wherein like reference numbers refer to like components throughout the several views, FIG. 1 schematically depicts a motor vehicle 10. The vehicle 10 includes a compression-ignition or diesel internal combustion engine 12 configured to propel the vehicle via driven wheels 14. Internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by an exhaust gas flow 26 that is released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

The vehicle 10 also includes a diesel engine after-treatment (AT) system 30. The AT system 30 includes a number of exhaust after-treatment devices configured to methodically remove particulate matter (PM) or soot, i.e., largely carbonaceous byproducts and emission constituents of engine combustion, from the exhaust gas flow 26. As shown, the AT system 30 operates as part of the exhaust system 28, and includes a diesel oxidation catalyst (DOC) 32. The primary function of the DOC 32 is reduction of carbon monoxides (CO) and non-methane hydrocarbons (NMHC). Additionally, the DOC 32 is configured to generate nitrogen dioxide ($NO_2$), which is required by a selective catalytic reduction (SCR) catalyst 34 that is arranged downstream of the DOC 32. The DOC 32 typically contains a catalyst substance made up of precious metals, such as platinum and/or palladium, which function therein to accomplish the above-noted objectives. Generally, with respect to generation of $NO_2$, the DOC 32 becomes activated and reaches operating efficiency at elevated temperatures. Therefore, as shown in FIG. 1, the DOC 32 may be close-coupled to the turbocharger 24 in order to reduce loss of thermal energy from the exhaust gas flow 26 prior to the gas reaching the DOC.

The SCR catalyst 34, on the other hand, is configured to convert NOx into diatomic nitrogen ($N_2$) and water ($H_2O$) with the aid of the $NO_2$ generated by the DOC 32. The SCR conversion process additionally requires a controlled or metered amount of a reductant having a general name of "diesel-exhaust-fluid" (DEF) 36 when the reductant is employed in diesel engines. The DEF 36 may be an aqueous solution of urea that includes water and ammonia ($NH_3$). The DEF 36 is injected into the exhaust gas flow 26 from a reservoir 37 at a location in the AT system 30 that is downstream of the DOC 32 and upstream of the SCR catalyst 34. Accordingly, the DEF 36 accesses the SCR catalyst 34 as the exhaust gas flow 26 flows through the SCR catalyst. An inner surface of the SCR catalyst 34 includes a wash coat that serves to attract the DEF 36 such that the DEF may interact with the exhaust gas flow 26 in the presence of NO and $NO_2$, and generate a chemical reaction to reduce NOx emissions from the engine 12.

After the SCR catalyst 34, the exhaust gas flow 26 proceeds to a second diesel oxidation catalyst (DOC) 38 arranged in tandem with and upstream of a diesel particulate filter (DPF) 40. The DOC 38 and DPF 40 may be housed inside a single canister 42, as shown in FIG. 1. The DOC 38 is configured to oxidize hydrocarbons and carbon monoxide present in the exhaust gas flow 26 into carbon dioxide ($CO_2$) and water. The DPF 40 is configured to collect and dispose of the particulate matter emitted by the engine 12 prior to the exhaust gas flow 26 being discharged to the atmosphere. Accordingly, the DPF 40 acts as a trap for removing the particulate matter, specifically, soot, from the exhaust flow. Similar to the DOC 32 described above, each of the DOC 38 and the DPF 40 typically contains precious metals, such as platinum and/or palladium, which function as catalysts in the subject devices to accomplish their respective objectives. After passing through the DOC 38 and DPF 40 inside the canister 42, the exhaust gas flow 26 is deemed to be sufficiently cleaned of the noxious particulate matter and may then be allowed to exit the exhaust system 28 to the atmosphere.

The AT system 30 may also include a number of temperature probes 44, 45, 46, 47, and 48 configured to sense temperature of the exhaust gas flow 26 at various points downstream of the engine 12. The AT system also 30 includes a controller 50. According to the disclosure, the controller 50 is configured to regulate operation of the engine 12, as well as operation of the exhaust after-treatment devices, namely the DOC 32, SCR catalyst 34, DOC 38, and DPF 40. Each of the temperature probes 44, 45, 46, 47, and 48 are in electrical communication with the controller 50 in order to facilitate regulation of the AT system 30.

The controller 50 may be configured as a central processing unit (CPU) configured to regulate operation of an internal combustion engine 12 (shown in FIG. 1), a hybrid-electric powertrain (not shown), or other alternative types of powerplants, as well as other vehicle systems, or a dedicated controller. In order to appropriately control operation of the AT system 30, the controller 50 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

During operation of the engine 12, hydrocarbons emitted by the engine 12 may at times become deposited on the DPF 40 and consequently affect operating efficiency of the AT system 30. Accordingly, the DPF 40 must be regenerated or cleaned after some particular amount of carbon-based soot is accumulated thereon to burn off the collected particulates. Regeneration of an exhaust after-treatment device may, for example, be commenced after a specific mass flow of air has been consumed by the engine for combustion over a period of time. Generally, such regeneration may be accomplished using high temperature exhaust gas flow to burn off the accumulated particles. The DPF 40 may be regenerated via fuel 18 being injected directly into the exhaust gas flow upstream of the DPF and then having the injected fuel ignited at an appropriate instance.

The vehicle 10 also includes a system 52 configured to assess efficiency of the DPF 40. The system 52 includes the DPF 40 and the controller 50, and may also include the DOC 38. The system 52 includes a particulate matter (PM) sensor 54 positioned downstream of the DPF 40 and configured to detect a flow rate of particulate matter exiting the DPF and communicate a signal indicative of the detected flow rate to the controller 50. Additionally, the system 52 includes an exhaust gas recirculation (EGR) valve 56 configured to regulate recirculation of a portion of the exhaust gas flow 26 to the engine 12 via a passage 58. The EGR valve 56 receives a portion of the exhaust gas flow 26 from the exhaust manifold 22 and directs that portion back to the engine's cylinders for compression and the power stroke. As a result, less fuel is used by the engine 12 on the power stroke, thereby avoiding engine knock, which permits the engine to run on a significantly leaner fuel-to-air ratio, as well as generate enhanced fuel economy and reduced gaseous emissions. However, with the EGR valve 56 recirculating the subject portion of the exhaust gas flow 26, the engine 12 typically generates an increased amount of particulate matter in the exhaust gas as compared with operation without EGR.

The AT system 30 also includes a specific device such as an HC injector 60 configured to selectively inject a predetermined amount of diesel fuel 18 into the exhaust gas flow 26 following the SCR catalyst 34 and upstream of the DOC 38. Such injection of the diesel fuel 18 is employed to superheat the exhaust gas flow and perform regeneration of the AT system 30, and specifically of the DPF 40. The controller 50 may regulate operation of the HC injector 60 to commence or trigger regeneration of the AT system 30 when such is deemed appropriate. The controller 50 is also configured to detect steady state operation of the engine 12 at which the engine generates a first flow rate 62 of particulate matter that the exhaust system 28 subsequently directs to the DPF 40. According to the present disclosure, the steady state operation of the engine 12 is identified as engine operation when each of the engine speed and load is substantially constant. The load on the engine 12 can be relatively constant when, for example, the vehicle 10 is traveling on a level surface at a steady road speed. The first flow rate 62 or concentration of particulate matter may be around 1.1 milligrams per cubic meter of exhaust gas flow 26.

The controller 50 is additionally configured to trigger, during the steady state operation of the engine 12, the EGR valve 56 to regulate exhaust gas recirculation to the engine's cylinders and thereby direct a second flow rate 64 of particulate matter via the exhaust passage 58 into the DPF 40. The second flow rate 64 of particulate matter may be greater than the first flow rate 62 by at least 10%, or at least 1.2 milligram per cubic meter of exhaust gas flow 26. In other words, the exhaust gas flow 26 directs a greater amount of particulate matter to the DPF 40 at the second flow rate 64 than at the first flow rate 62. Typically, the maximum flow rate or concentration of particulate matter from a representative engine 12 occurs during transient engine operation, and may reach around 52.8 milligrams per cubic meter of exhaust gas flow 26.

The controller 50 is additionally configured to receive from the PM sensor 54 a signal indicative of a detected flow rate 66 of particulate matter exiting the DPF 40 in response to the second flow rate 64 of particulate matter directed into the DPF. The controller 50 is also configured to compare the detected flow rate 66 of particulate matter exiting the DPF 40 with a particulate matter flow rate threshold 68. The controller 50 is also configured to regulate injection of fuel 18 via the HC injector 60 into the exhaust system 28 to regenerate the DPF 40, e.g., via transmission of appropriate control signals, if the detected flow rate 66 of particulate matter exiting the DPF is greater than the particulate matter flow rate threshold 68. The particulate matter flow rate threshold 68 may be set around 15 milligrams per mile traveled by the vehicle 10.

At times, such as during the steady state operation of the engine 12, the first flow rate 62 of particulate matter can have such low magnitude that the first flow rate is outside detection accuracy and/or sensitivity of the PM sensor 54. On the other hand, when the EGR valve 56 recirculates a portion of the exhaust gas flow 26 to the engine 12, the second flow rate 64 of particulate matter will be increased relative to the first flow rate 62 to a degree that the second flow rate will be within the detection and/or sensitivity of the PM sensor 54. The noted detection accuracy and sensitivity of the PM sensor 54 can be reduced in a "seasoned" PM sensor by collection of particulate matter thereon over accumulated cycles of operation. Accordingly, the second flow rate 64 of particulate matter can be selected such that a seasoned PM sensor 54 can also be reliably employed to assess effectiveness of the DPF 40.

The above described recirculation of a portion of the exhaust gas flow 26 to the engine 12 via the EGR valve 56 permits an intrusive assessment of efficiency of the DPF 40 in the AT system 30. As employed herein, the term "intrusive" means that the operation of the host engine 12 is modified for the subject limited purpose of efficiency assessment of the DPF 40. Such an intrusive assessment of DPF 40 efficiency is intended to have a minimal impact on emissions of engine 12 because the actual increase in production of the particulate matter during steady operation of the engine is significantly below any specific emission requirements.

The controller 50 may be additionally configured to set a signal 70 identifying that the DPF 40 is malfunctioning or has failed, if the detected flow rate 66 of particulate matter exiting the DPF is greater than the particulate matter flow rate threshold 68. Such an assessment is generally indicative of the DPF 40 having degraded and currently unable to remove the necessary amount of particulate matter. The controller 50 can be configured to perform such an assessment and setting of the signal 70 following the regulated injection of fuel 18 via the HC injector 60 to burn off particulate matter collected in the DPF 40. The signal 70 may be generated via a malfunction indicator lamp (MIL) and/or a trouble code embedded in the memory of the controller 50 for subsequent retrieval by an authorized entity. Typically, the particulate matter can escape an effective DPF 40 in the range of 1 to 10 milligrams per mile traveled by the vehicle 10. For comparison, if the particulate matter escapes a DPF 40 in the range of 15 to 50 milligrams per mile traveled by the vehicle 10 or greater, the subject DPF can be considered faulty.

The controller 50 can be programmed with a look-up table 72 correlating the second flow rate 64 of particulate matter directed into the DPF 40 during the steady state operation of the engine 12 with the detected flow rate 66 of particulate matter exiting the DPF 40. The reference data for the look-up table 72 can be compiled empirically during testing and validation of the AT system 30. Such tabulated correlation between the second flow rate 64 and the detected flow rate 66 can establish a threshold for an effective or acceptable DPF 40, i.e., a DPF generating particulate matter below the flow rate threshold 68, to be used by the controller 50 for setting the signal 70.

Figure 2:
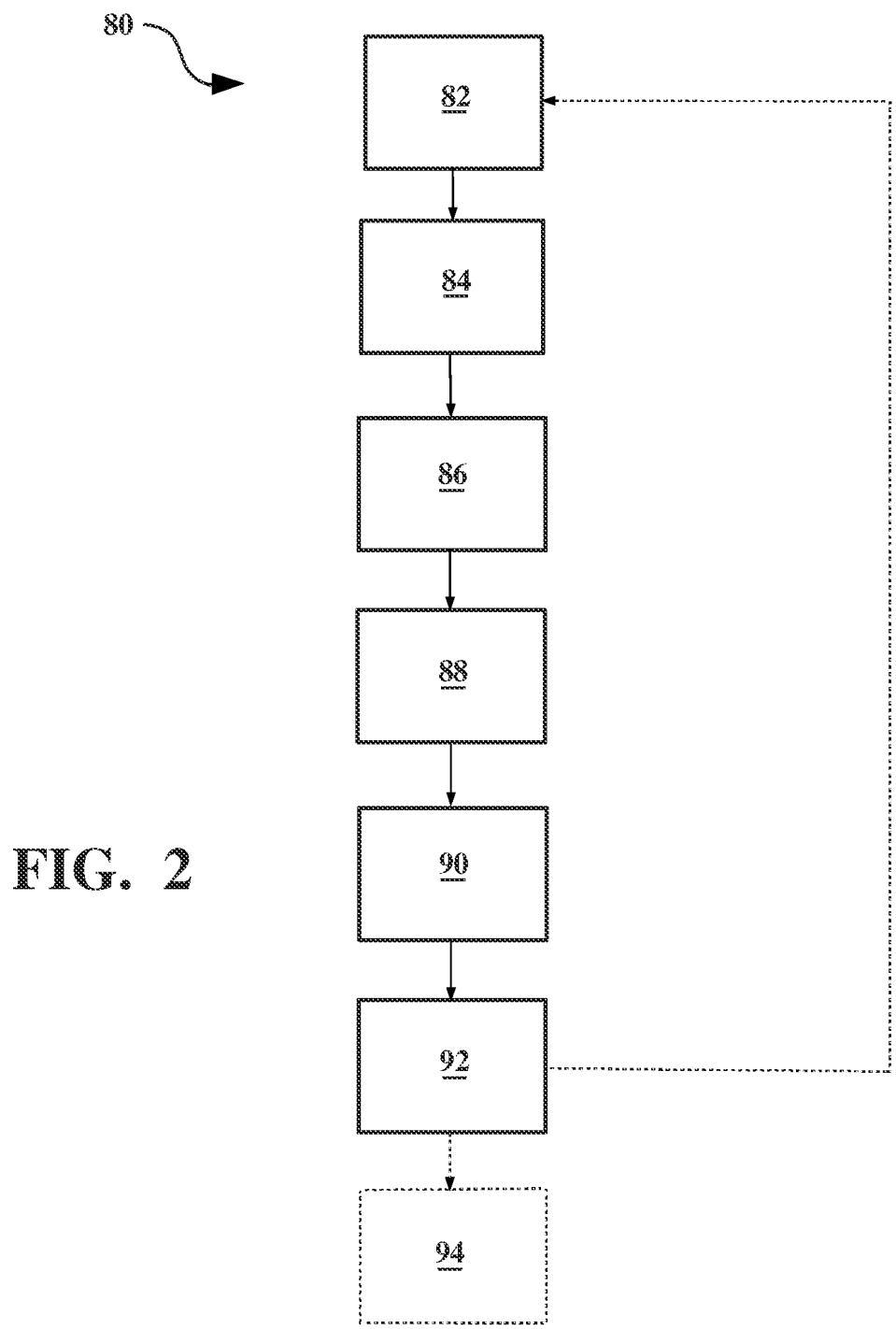
FIG. 2 is a flow diagram of a method of assessing efficiency of a diesel particulate filter (DPF) in an exhaust after-treatment (AT) system shown in FIG. 1.

FIG. 2 depicts a method 80 of controlling the diesel engine 12 for intrusive assessment of efficiency of the DPF 40 in the AT system 30, as described above with respect to FIG. 1. The method initiates in frame 82, where it includes detecting, via the controller 50, steady state operation of the engine 12 at which the engine generates the first flow rate 62 of particulate matter directed via the exhaust system into the DPF 40. After frame 82, the method advances to frame 84 where the method includes triggering, during the steady state operation of the engine 12, the EGR valve 56 to regulate exhaust gas recirculation, such as by increasing the amount of EGR, to the engine and thereby direct the second flow rate 64 of particulate matter via the exhaust system 28 into the DPF 40. As discussed above with respect to FIG. 1, the second flow rate 64 is greater than the first flow rate 62.

Following frame 84, the method proceeds to frame 86 where the method includes detecting, via the PM sensor 54, the flow rate of particulate matter exiting the DPF 40 in response to the second flow rate 64 of particulate matter directed into the DPF. After frame 86, the method proceeds to frame 88 and includes communicating, via the PM sensor 54, to the controller 50 the signal 70 indicative of the detected flow rate 66 of particulate matter exiting the DPF 40. Following frame 88, the method advances to frame 90 and includes comparing, via the controller 50, the detected flow rate 66 of particulate matter exiting the DPF 40 with the particulate matter flow rate threshold 68. After frame 90, the method proceeds to frame 92 where the method includes regulating, the HC injector 60 via the controller 50, to inject fuel 18 into the exhaust system 28 for regenerating the DPF 40, if the detected flow rate 66 of particulate matter exiting the DPF is greater than the particulate matter flow rate threshold 68.

After regeneration of the DPF 40 in frame 92, the method may loop back to frame 82. Accordingly, the controller 50 may be programmed to continuously monitor the operation of the engine 12 and the AT system 30 to trigger such an intrusive assessment of efficiency of the DPF 40. On the other hand, following frame 92 the method may proceed to frame 94, where the controller 50 sets a signal indicative of the DPF 40 having failed, if the detected flow rate 66 of particulate matter exiting the DPF is greater than the particulate matter flow rate threshold 68 following the injection of fuel 18 via the 1-IC injector 60. As discussed above with respect to FIG. 1, the controller 50 may be programmed with the look-up table 72 correlating the second flow rate 64 of particulate matter directed into the DPF 40 during the steady state operation of the engine 12 with the detected flow rate 66 of particulate matter exiting the DPF to establish a threshold for an acceptable DPF.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a diesel engine in fluid communication, via an exhaust system, with an exhaust after-treatment (AT) system having a diesel particulate filter (DPF), the method comprising:
    detecting, via a controller, steady state operation of the diesel engine at which the engine generates a first flow rate of particulate matter directed via the exhaust system into the DPF;
    triggering, during the steady state operation of the engine, via the controller, a valve to regulate exhaust gas recirculation (EGR) to the engine and thereby direct a second flow rate of particulate matter via the exhaust system into the DPF, wherein the second flow rate is greater than the first flow rate;
    detecting, via a particulate matter (PM) sensor, a flow rate of particulate matter exiting the DPF in response to the second flow rate of particulate matter directed into the DPF;
    communicating, via the PM sensor, to the controller a signal indicative of the detected flow rate of particulate matter exiting the DPF;
    comparing, via the controller, the detected flow rate of particulate matter exiting the DPF with a particulate matter flow rate threshold; and
    regulating, via the controller, injection of fuel into the exhaust system to regenerate the DPF, if the detected flow rate of particulate matter exiting the DPF is greater than the particulate matter flow rate threshold.

2. The method of claim 1, wherein the steady state operation of the diesel engine is identified as engine operation when each of a speed of and a load on the engine is constant.

3. The method of claim 1, further comprising setting a signal indicative of the DPF having failed, if the detected flow rate of particulate matter exiting the DPF is greater than the particulate matter flow rate threshold following said regulating injection of fuel into the exhaust system.

4. The method of claim 3, wherein the controller is programmed with a look-up table correlating the second flow rate of particulate matter directed via the exhaust system into the DPF during the steady state operation of the engine with the detected flow rate of particulate matter exiting the DPF to establish a threshold for an acceptable DPF.

5. The method of claim 1, wherein the first flow rate of particulate matter (PM—soot) is outside detection accuracy and/or sensitivity of the PM sensor, and wherein the second flow rate of particulate matter is within detection accuracy and/or sensitivity of the PM sensor.

6. The method of claim 5, wherein detection accuracy and/or sensitivity of the PM sensor is reduced by collection of particulate matter thereon.

7. The method of claim 1, wherein the diesel engine is installed in a vehicle, and wherein the first flow rate of particulate matter is around 1.1 milligrams per cubic meter of exhaust gas flow.

8. The method of claim 1, wherein the diesel engine is installed in a vehicle, and wherein the second flow rate of particulate matter is greater than the first flow rate by at least 10%.

9. A method of assessing efficiency of a diesel particulate filter (DPF) in an exhaust after-treatment (AT) system for a diesel internal combustion engine having a controller, the method comprising:
    detecting, via the controller, steady state operation of the diesel engine at which the engine generates a first flow rate of particulate matter directed via an exhaust system into the DPF;
    triggering, during the steady state operation of the engine, via the controller, a valve to regulate exhaust gas recirculation (EGR) to the engine and thereby direct a second flow rate of particulate matter via the exhaust system into the DPF, wherein the second flow rate is greater than the first flow rate;
    detecting, via a particulate matter (PM) sensor, a flow rate of particulate matter exiting the DPF in response to the second flow rate of particulate matter directed into the DPF;

communicating, via the PM sensor, to the controller a signal indicative of the detected flow rate of particulate matter exiting the DPF;

comparing, via the controller, the detected flow rate of particulate matter exiting the DPF with a particulate matter flow rate threshold; and regulating, via the controller, injection of fuel into the exhaust system to regenerate the DPF, if the detected flow rate of particulate matter exiting the DPF is greater than the particulate matter flow rate threshold.

10. The method of claim 9, wherein the steady state operation of the diesel engine is identified as engine operation when each of a speed of and a load on the engine is constant.

11. The method of claim 9, further comprising setting a signal indicative of the DPF having failed, if the detected flow rate of particulate matter exiting the DPF is greater than the particulate matter flow rate threshold following said regulating injection of fuel into the exhaust system.

12. The method of claim 11, wherein the controller is programmed with a look-up table correlating the second flow rate of particulate matter directed via the exhaust system into the DPF during the steady state operation of the engine with the detected flow rate of particulate matter exiting the DPF to establish a threshold for an acceptable DPF.

13. The method of claim 9, wherein the first flow rate of particulate matter is outside detection accuracy/sensitivity of the PM sensor, and wherein the second flow rate of particulate matter is within detection accuracy and/or sensitivity of the PM sensor.

14. The method of claim 13, wherein detection accuracy and/or sensitivity of the PM sensor is reduced by collection of particulate matter thereon.

15. The method of claim 9, wherein the diesel engine is installed in a vehicle, and wherein the first flow rate of particulate matter is around 1.1 milligrams per cubic meter of exhaust gas flow.

16. The method of claim 9, wherein the diesel engine is installed in a vehicle, and wherein the second flow rate of particulate matter is greater than the first flow rate by at least 10%.

17. A system for assessing efficiency of a diesel particulate filter (DPF) in an exhaust after-treatment (AT) system for a diesel internal combustion engine, the system comprising:

an exhaust system providing fluid communication between the engine and the DPF;

a particulate matter (PM) sensor positioned downstream of the DPF and configured to detect a flow rate of particulate matter exiting the DPF and communicate a signal indicative of the detected flow rate of particulate matter exiting the DPF;

a valve configured to regulate exhaust gas recirculation (EGR) to the engine; and a controller configured to:

detect steady state operation of the diesel engine at which the engine generates a first flow rate of particulate matter directed via the exhaust system into the DPF;

trigger, during the steady state operation of the engine, a valve to regulate exhaust gas recirculation (EGR) to the engine and thereby direct a second flow rate of particulate matter via the exhaust system into the DPF, wherein the second flow rate is greater than the first flow rate;

receive from the PM sensor the signal indicative of the detected flow rate of particulate matter exiting the DPF in response to the second flow rate of particulate matter directed into the DPF;

compare the detected flow rate of particulate matter exiting the DPF with a particulate matter flow rate threshold; and regulate injection of fuel into the exhaust system to regenerate the DPT, if the detected flow rate of particulate matter exiting the DPF is greater than the particulate matter flow rate threshold.

18. The system of claim 17, wherein the steady state operation of the diesel engine is identified as engine operation when each of a speed of and a load on the engine is constant.

19. The system of claim 17, wherein the controller is additionally configured to set a signal indicative of the DPF having failed, if the detected flow rate of particulate matter exiting the DPF is greater than the particulate matter flow rate threshold following the regulated injection of fuel into the exhaust system.

20. The system of claim 19, wherein the controller is programmed with a look-up table correlating the second flow rate of particulate matter directed via the exhaust system into the DPF during the steady state operation of the engine with the detected flow rate of particulate matter exiting the DPF to establish a threshold for an acceptable DPF.

* * * * *